United States Patent
Kaji et al.

(10) Patent No.: US 12,352,919 B2
(45) Date of Patent: Jul. 8, 2025

(54) INSPECTION ASSISTANCE APPARATUS, INSPECTION ASSISTANCE METHOD, AND COMPUTER READABLE RECORDING MEDIUM

(71) Applicant: NEC Corporation, Tokyo (JP)

(72) Inventors: Masahiro Kaji, Tokyo (JP); Kazuyuki Ikemura, Tokyo (JP); Shinichi Yoshitsune, Tokyo (JP); Kaori Takeuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 393 days.

(21) Appl. No.: 17/798,239

(22) PCT Filed: Feb. 9, 2021

(86) PCT No.: PCT/JP2021/004694
§ 371 (c)(1),
(2) Date: Aug. 8, 2022

(87) PCT Pub. No.: WO2021/166727
PCT Pub. Date: Aug. 26, 2021

(65) Prior Publication Data
US 2023/0142100 A1     May 11, 2023

(30) Foreign Application Priority Data
Feb. 20, 2020    (JP) .................. 2020-027543

(51) Int. Cl.
*G01V 5/22*     (2024.01)
*G01N 23/04*    (2018.01)
*G01N 23/10*    (2018.01)

(52) U.S. Cl.
CPC .............. *G01V 5/22* (2024.01); *G01N 23/04* (2013.01); *G01N 23/10* (2013.01)

(58) Field of Classification Search
CPC ...... G01N 23/04; G01N 23/083; G01N 23/10; G06T 7/0008; G06T 7/0004; G06T 7/0002; G06T 7/00; G01V 5/22
See application file for complete search history.

(56) References Cited

U.S. PATENT DOCUMENTS

| | | | |
|---|---|---|---|
| 2006/0008051 A1* | 1/2006 | Heaton | G01V 5/223 378/57 |
| 2007/0019841 A1* | 1/2007 | Hirose | G01N 23/04 382/110 |

(Continued)

FOREIGN PATENT DOCUMENTS

| | | |
|---|---|---|
| JP | 2010-140444 A | 6/2010 |
| JP | 2018-206082 A | 12/2018 |

(Continued)

OTHER PUBLICATIONS

International Search Report for PCT Application No. PCT/JP2021/004694, mailed on Apr. 27, 2021.

(Continued)

*Primary Examiner* — David P Porta
*Assistant Examiner* — Soorena Kefayati

(57) ABSTRACT

An inspection assistance apparatus 10 to improve the accuracy of detection of a specific article, comprising a first certainty degree output unit 11 for inputting, to a model, a transmission image obtained by irradiating an article to be inspected with electromagnetic waves, and outputting a first certainty degree indicating that the article is a specific article; and a first determination unit 12 for determining that the article is the specific article in a case where the first certainty degree that has been changed based on an inspection result is equal to or higher than a pre-set first certainty degree threshold, the inspection result being obtained by conducting one or more inspections with respect to the article.

5 Claims, 14 Drawing Sheets

(56) References Cited

U.S. PATENT DOCUMENTS

| | | | |
|---|---|---|---|
| 2009/0310744 A1* | 12/2009 | Petch | G01N 23/087 378/53 |
| 2010/0277312 A1* | 11/2010 | Edic | G01V 5/222 378/57 |
| 2011/0019797 A1* | 1/2011 | Morton | G01N 24/084 378/57 |
| 2012/0093367 A1* | 4/2012 | Gudmundson | G01V 5/20 382/103 |
| 2012/0207351 A1* | 8/2012 | Delianski | G01V 5/22 382/103 |
| 2015/0325010 A1* | 11/2015 | Bedford | G01V 5/22 378/57 |
| 2017/0242148 A1* | 8/2017 | Yu | G06Q 10/08 |
| 2017/0270366 A1* | 9/2017 | Kuznetsov | G08B 21/02 |
| 2017/0366685 A1* | 12/2017 | Hirooka | H04N 1/00183 |
| 2018/0106733 A1* | 4/2018 | Li | G06T 17/00 |
| 2019/0057285 A1 | 2/2019 | Hisada | |
| 2020/0105414 A1* | 4/2020 | Kikuchi | G16H 30/20 |
| 2020/0393390 A1 | 12/2020 | Kaji et al. | |

FOREIGN PATENT DOCUMENTS

| | | |
|---|---|---|
| JP | 2019-174421 A | 10/2019 |
| WO | 2017/145960 A1 | 8/2017 |

OTHER PUBLICATIONS

English translation of Written opinion for PCT Application No. PCT/JP2021/004694, mailed on Apr. 27, 2021.

\* cited by examiner

Fig.3

| | ITEM | CERTAINTY DEGREE |
|---|---|---|
| MODEL | A | Conf_11 |
| | B | Conf_12 |
| | C | Conf_13 |
| | D | Conf_14 |
| | E | Conf_15 |

Fig.4

| DETERMINATION CONDITIONS | CHANGE VALUE |
|---|---|
| CONDITION 1 | Chg_11 |
| CONDITION 2 | Chg_12 |
| CONDITION 3 | Chg_13 |
| CONDITION 4 | Chg_14 |
| CONDITION 5 | Chg_15 |
| CONDITION 6 | Chg_16 |
| ⋮ | ⋮ |

| MODEL | CERTAINTY DEGREE THRESHOLD |
|---|---|
| A | Th_1 |
| B | Th_2 |
| C | Th_3 |
| D | Th_4 |
| E | Th_5 |

| DETERMINATION CONDITIONS | THRESHOLD CHANGE VALUE |
|---|---|
| CONDITION 1 | Chg_21 |
| CONDITION 2 | Chg_22 |
| CONDITION 3 | Chg_23 |
| CONDITION 4 | Chg_24 |
| CONDITION 5 | Chg_25 |
| CONDITION 6 | Chg_26 |
| ⋮ | ⋮ |

| MODEL DETERMINATION CONDITIONS | MODEL |
|---|---|
| MODEL CONDITION 1 | A |
| MODEL CONDITION 2 | B |
| MODEL CONDITION 3 | C |
| MODEL CONDITION 4 | D |
| MODEL CONDITION 5 | E |
| MODEL CONDITION 6 | A |
| ⋮ | ⋮ |

Fig.8

| MODEL | RISK |
|---|---|
| A | R_1 |
| B | R_2 |
| C | R_3 |
| D | R_4 |
| E | R_5 |

| DETERMINATION CONDITIONS | RISK CHANGE VALUE |
|---|---|
| CONDITION 1 | RChg_1 |
| CONDITION 2 | RChg_2 |
| CONDITION 3 | RChg_3 |
| CONDITION 4 | RChg_4 |
| CONDITION 5 | RChg_5 |
| CONDITION 6 | RChg_6 |
| ⋮ | ⋮ |

91

INSPECTION ASSISTANCE APPARATUS, INSPECTION ASSISTANCE METHOD, AND COMPUTER READABLE RECORDING MEDIUM

This application is a National Stage Entry of PCT/JP2021/004694 filed on Feb. 9, 2021, which claims priority from Japanese Patent Application 2020-027543 filed on Feb. 20, 2020, the contents of all of which are incorporated herein by reference, in their entirety.

TECHNICAL FIELD

The invention relates to an inspection assistance apparatus and an inspection assistance method for assisting inspections that use electromagnetic waves, and further relates to a computer readable recording medium with a program for realizing these apparatus and method recorded thereon.

BACKGROUND ART

Articles that are imported to Japan from foreign countries include socially improper articles (such articles as various types of prohibited items and restricted items), hazardous materials in aviation, and so on. Inspections of imported articles are conducted using X-ray inspection apparatuses at, for example, customs, overseas mail sub-branch customs, and the like. Furthermore, similar inspections are also conducted at the bases of logistic service providers and the like.

As a related technique, patent document 1 discloses a sorting assistance apparatus for sorting whether inspection targets include a specific article. According to the sorting assistance apparatus of patent document 1, a transmission image obtained by irradiating inspection targets with electromagnetic waves is input to a model that outputs a degree of certainty that the inspection targets include a specific article, and whether the inspection targets include a specific article is determined with use of the degree of certainty output from the model. Note that the regarding the foregoing model, there are a plurality of models that respectively correspond to different intended uses, and an optimum model is selected and used in accordance with an intended use.

LIST OF RELATED ART DOCUMENTS

Patent Document

Patent document 1: Japanese Patent Laid-Open Publication No. 2019-174421

SUMMARY OF INVENTION

Technical Problems

However, specific articles, such as socially improper articles, included among inspection targets cannot be detected with high accuracy even by inspections that are conducted using an X-ray inspection apparatus or the sorting assistance apparatus of patent document 1. Therefore, in reality, inspectors further conduct inspections on-site independently from the inspections that use X-rays.

An example object of the invention is to provide an inspection assistance apparatus, an inspection assistance method, and a computer readable recording medium that improve the accuracy of detection of a specific article.

Solution to the Problems

In order to achieve the example object described above, an inspection assistance apparatus according to an example aspect of the invention includes:

a first certainty degree output unit configured to input, to a model, a transmission image obtained by irradiating an article to be inspected with electromagnetic waves, and output a first certainty degree indicating that the article is a specific article; and a first determination unit configured to determine that the article is the specific article in a case where the first certainty degree that has been changed based on an inspection result is equal to or higher than a pre-set first certainty degree threshold, the inspection result being obtained by conducting one or more inspections with respect to the article.

Also, in order to achieve the example object described above, an inspection assistance apparatus according to an example aspect of the invention includes:

a third certainty degree output unit configured to input, to a model, a transmission image obtained by irradiating an article to be inspected with electromagnetic waves as well as an inspection result obtained by conducting one or more inspections with respect to the article, and output a third certainty degree indicating that the article is a specific article; and a second determination unit configured to determine that the article is a specific article in a case where the third certainty degree is equal to or higher than a pre-set third certainty degree threshold.

Also, in order to achieve the example object described above, an inspection assistance method according to an example aspect of the invention includes:

a first certainty degree output step of inputting, to a model, a transmission image obtained by irradiating an article to be inspected with electromagnetic waves, and outputting a first certainty degree indicating that the article is a specific article; and a first determination step of determining that the article is the specific article in a case where the first certainty degree that has been changed based on an inspection result is equal to or higher than a pre-set first certainty degree threshold, the inspection result being obtained by conducting one or more inspections with respect to the article.

Also, in order to achieve the example object described above, an inspection assistance method according to an example aspect of the invention includes:

a third certainty degree output step of inputting, to a model, a transmission image obtained by irradiating an article to be inspected with electromagnetic waves as well as an inspection result obtained by conducting one or more inspections with respect to the article, and outputting a third certainty degree indicating that the article is a specific article; and a second determination step of determining that the article is a specific article in a case where the third certainty degree is equal to or higher than a pre-set third certainty degree threshold.

Also, in order to achieve the example object described above, a computer-readable recording medium according to an example aspect of the invention includes a program recorded on the computer-readable recording medium, the program including instructions that cause the computer to carry out:

a first certainty degree output step of inputting, to a model, a transmission image obtained by irradiating an article to be inspected with electromagnetic waves, and outputting a first certainty degree indicating that the article is a specific article; and a first determination step of determining that the article is the specific article in a case where the first certainty degree that has been changed based on an inspection result is equal to or higher than a pre-set first certainty degree threshold, the inspection result being obtained by conducting one or more inspections with respect to the article.

Furthermore, in order to achieve the example object described above, a computer-readable recording medium according to an example aspect of the invention includes a program recorded on the computer-readable recording medium, the program including instructions that cause the computer to carry out:

a third certainty degree output step of inputting, to a model, a transmission image obtained by irradiating an article to be inspected with electromagnetic waves as well as an inspection result obtained by conducting one or more inspections with respect to the article, and outputting a third certainty degree indicating that the article is a specific article; and a second determination step of determining that the article is a specific article in a case where the third certainty degree is equal to or higher than a pre-set third certainty degree threshold.

Advantageous Effects of the Invention

As described above, according to the invention, it is possible to improve the accuracy of detection of a specific article.

BRIEF DESCRIPTION OF THE DRAWINGS

FIG. 3 is a diagram for describing the relationship between specific articles and certainty degrees.

FIG. 4 is a diagram for describing a data structure of the determination information.

FIG. 5 is a diagram for describing a data structure of the threshold information.

FIG. 6 is a diagram for describing a data structure of the determination information.

FIG. 7 is a diagram for describing a data structure of the model selection information.

FIG. 8 is a diagram for describing a data structure of the risk information.

FIG. 9 is a diagram for describing a data structure of the determination information.

EXAMPLE EMBODIMENTS

First Example Embodiment

Figure 1:
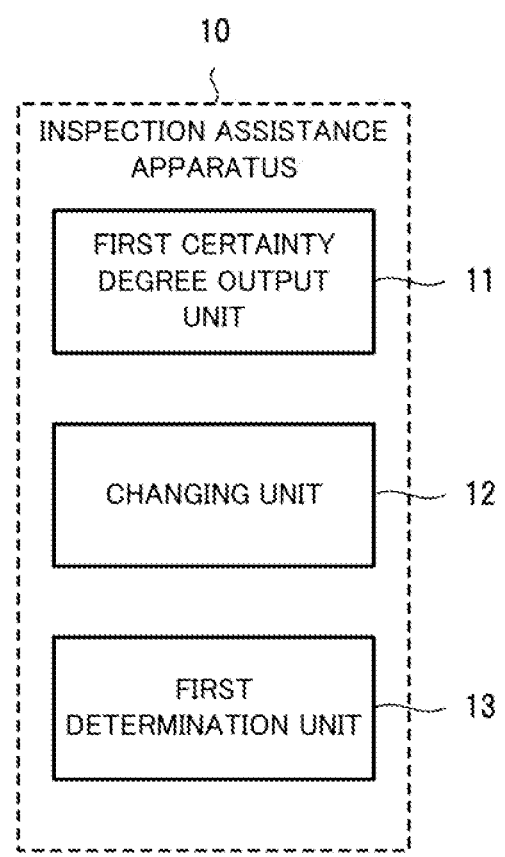
FIG. 1 is a diagram for describing one example of an inspection assistance apparatus.

Below, an example embodiment of the invention will be described with reference to the drawings. Note that in the drawings described below, the elements that have the same functions or corresponding functions are given the same reference sign, and a repetitive description thereof may be omitted.

[Apparatus Configuration]

The configuration of an inspection assistance apparatus 10 in the example embodiment is now described using FIG. 1. FIG. 1 is a diagram for describing one example of an inspection assistance apparatus.

The inspection assistance apparatus 10 shown in FIG. 1 is an apparatus that improves the accuracy of detection of a specific article. Also, as shown in FIG. 1, the inspection assistance apparatus 10 includes a first certainty degree output unit 11, a changing unit 12, and a first determination unit 13.

Among these, the first certainty degree output unit 11 inputs, to a model, a transmission image obtained by irradiating an article to be inspected with electromagnetic waves, and outputs a first certainty degree indicating that the article is a specific article.

The transmission image is, for example, an image obtained from transmitted X-rays after irradiating an article, or an external package enveloping the article, with X-rays with use of an X-ray inspection apparatus and the like.

The model is a model that has been generated using AI (Artificial Intelligence), such as deep learning. The model is, for example, generated through machine learning by inputting a large amount of transmission images (data set) in a learning phase. The model is stored in a storage device provided inside the inspection assistance apparatus 10, or in a storage apparatus provided independently from the inspection assistance apparatus 10.

For instance, the first certainty degree is an index indicating, for example, the certainty (likelihood) that the article to be inspected is a specific article as a result of inspecting a transmission image with use of the model (model inspection). Possible examples of the specific article include socially improper articles (such articles as various types of prohibited items and restricted items), and hazardous materials in aviation.

The changing unit 12 changes the first certainty degree based on an inspection result that is obtained by conducting one or more inspections with respect to the article.

Examples of the inspections include an external package inspection, a weight inspection, a dimension inspection, an odor inspection, a texture inspection, a temperature inspection, and so on. The external package inspection is, for example, an inspection for estimating the place from which an article inside an external package was addressed (the place of departure), either manually or automatically, with use of the characteristics of the external package, such as the material of the external package enveloping the article, and the characters, pictures, and stamps on the external package. Note that no restriction is intended with regard to the foregoing characteristics, and characteristics other than the foregoing characteristics may be used.

The weight inspection is an inspection that measures the weight of an article or an external package enveloping the article with use of a weight sensor. The dimension inspection is an inspection that measures the dimension of an article or an external package enveloping the article based on an image captured by an image capturing apparatus, such as a camera. The odor inspection is an inspection that measures the odor of an article or an external package enveloping the article with use of an odor sensor. The texture inspection is an inspection that measures the texture of an article or an external package enveloping the article, either manually or automatically, with use of a pressure sensor and the like. The temperature inspection is an inspection that measures the temperature of an article or an external package enveloping the article with use of a temperature sensor, a thermal image camera, and the like.

Also, the inspections may include an inspection that measures the number of articles.

In a case where the changed first certainty degree is equal to or higher than a pre-set first certainty degree threshold, the first determination unit 13 determines that the article is a specific article.

In the example embodiment, the first certainty degree indicating that an article is a specific article is changed using the results of one or more inspections that are different from the model inspection, and thus the accuracy of detection of a specific article can be improved.

[System Configuration]

Figure 2:
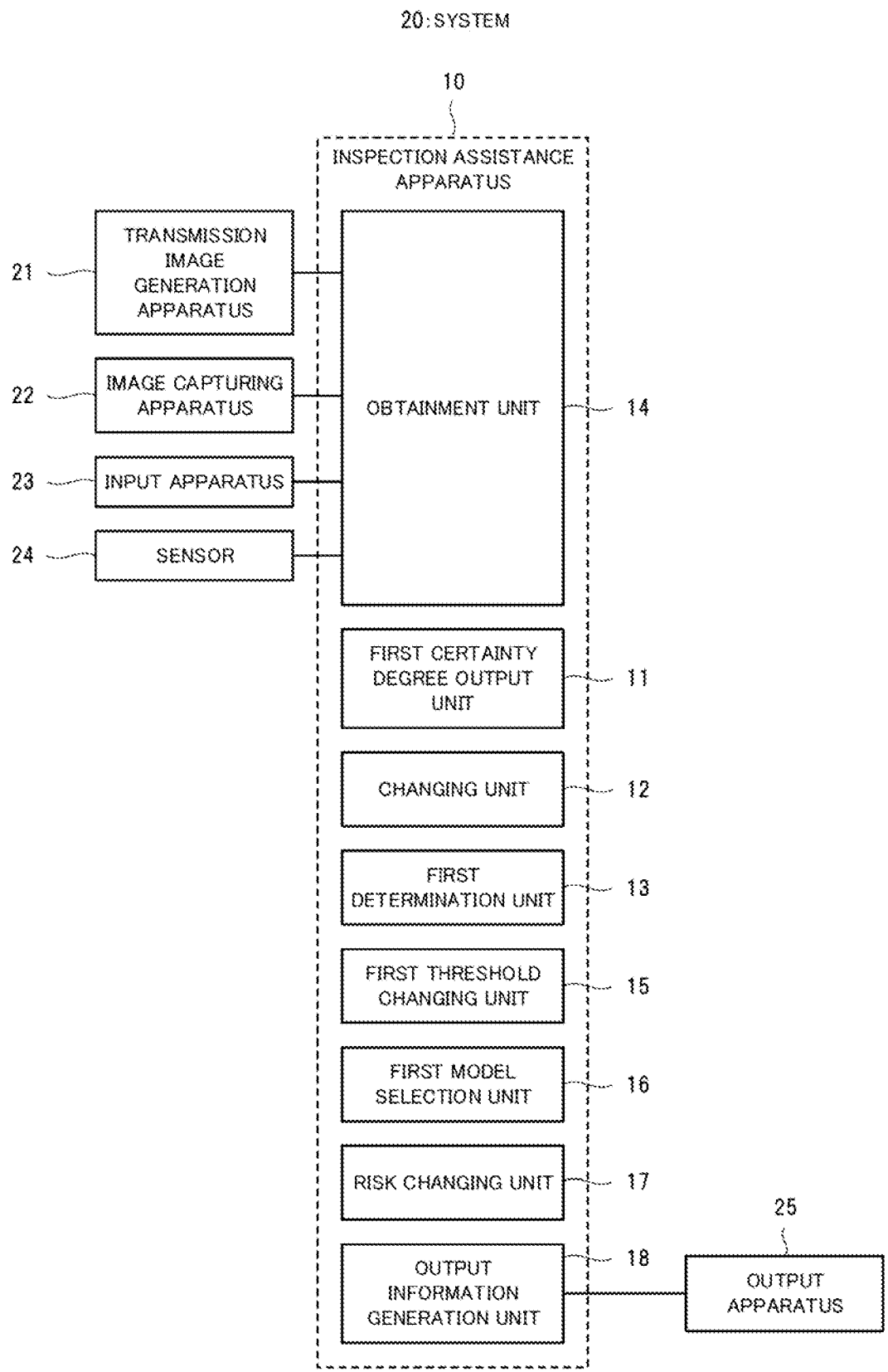
FIG. 2 is a diagram for describing one example of a system that includes an inspection assistance apparatus.

Subsequently, the configuration of the inspection assistance apparatus 10 in the example embodiment will be described more specifically using FIG. 2. FIG. 2 is a diagram for describing one example of a system that includes an inspection assistance apparatus.

As shown in FIG. 2, a system 20 in the example embodiment includes a transmission image generation apparatus 21, an image capturing apparatus 22, an input apparatus 23, a sensor 24, and an output apparatus 25, in addition to the inspection assistance apparatus 10. Also, the inspection assistance apparatus 10 in the example embodiment includes an obtainment unit 14, a first threshold changing unit 15, a first model selection unit 16, a risk changing unit 17, and an output information generation unit 18, in addition to the first certainty degree output unit 11, the changing unit 12, and the first determination unit 13.

The inspection assistance apparatus 10 is an apparatus that improves the accuracy of detection of a specific article with use of not only the output of a model inspection (the first certainty degree), but also one or more other inspection results. For instance, the inspection assistance apparatus 10 is an information processing apparatus such as a circuit and a computer provided with a programmable device (e.g., a programmable device such as a CPU (Central Processing Unit) and an FPGA (Field-Programmable Gate Array)), a GPU (Graphics Processing Unit), or one or more of these. Note that the inspection assistance apparatus 10 may be an information processing apparatus such as a server computer and a mobile terminal.

The transmission image generation apparatus 21 (e.g., an apparatus such as an X-ray imaging apparatus) is an apparatus that irradiates an externally-packaged article to be inspected with X-rays, measures the magnitude of the transmitted X-ray dose or reflection, and generates a transmission image with use of the result of measurement. Specifically, first, the transmission image generation apparatus 21 generates a transmission image by capturing an image of an externally-packaged article to be inspected at a predetermined position. Subsequently, the transmission image generation apparatus 21 transmits the generated transmission image to the obtainment unit 14. Note that an apparatus that obtains a transmission image is not limited to an X-ray imaging apparatus; for example, a passive millimeter-wave imaging apparatus that uses millimeter waves may be used thereas.

The image capturing apparatus 22 captures an image of the article or the external package of the article to be inspected. Specifically, the image capturing apparatus 22, which is a camera or the like, captures an image of the article or the external package of the article to be inspected at a predetermined position. Subsequently, the image capturing apparatus 22 outputs the generated image to the obtainment unit 14. Note that this captured image is used in a dimension inspection and the like.

The input apparatus 23 is an apparatus that is intended for an inspector to input the result of the aforementioned inspection (inspection result) with respect to the article or the externally-packaged article to be inspected. Specifically, first, the inspector inputs the inspection result to the input apparatus 23 with use of user interfaces, such as a touchscreen, a keyboard, and a mouse. Subsequently, the inspection result input by the input apparatus 23 is transmitted to the obtainment unit 14.

The sensor 24 is, for example, a sensor such as a weight sensor used in a weight inspection, an odor sensor used in an odor inspection, a pressure sensor used in a texture inspection, and a temperature sensor or a thermal image camera used in a temperature inspection. Note that the sensor 24 is not limited to the foregoing sensors.

The output apparatus 25 obtains output information that has been converted by the output information generation unit 18 into a format that can be output, and outputs generated images, sounds, and the like based on this output information. The output apparatus 25 is, for example, an image display apparatus or the like that uses liquid crystal, organic EL (Electro Luminescence), or a CRT (Cathode Ray Tube). Furthermore, the image display apparatus may include, for example, a sound output device, such as a speaker. Note that the output apparatus 25 may be a printing apparatus, such as a printer. Alternatively, the output apparatus 25 may be a rotating light or the like.

Below is a detailed description of the inspection assistance apparatus.

The obtainment unit 14 obtains the transmission image and the inspection result (the image obtained by capturing the article or the external package of the article, the inspection result input by the input apparatus 23, the output result from the sensor 24 (various types of sensors), and so on). Subsequently, the obtainment unit 14 outputs the inspection result to the first threshold changing unit 15 and the first model selection unit 16. The obtainment unit 14 outputs the transmission image to the first certainty degree output unit 11.

The first certainty degree output unit 11 inputs the transmission image to a model, and obtains, from the model, a first certainty degree indicating that the article or the article inside the external package is a specific article. Specifically, first, the first certainty degree output unit 11 obtains the transmission image from the obtainment unit 14. Subsequently, the first certainty degree output unit 11 inputs the obtained transmission image to a model. Subsequently, the first certainty degree output unit 11 obtains the first certainty degree output from the model. Subsequently, the first certainty degree output unit 11 outputs the first certainty degree to the changing unit 12 and the output information generation unit 18.

A description is now given of a case where the items of specific articles are A to E, for example. FIG. 3 is a diagram for describing the relationship between specific articles and certainty degrees. In the example of FIG. 3, in a case where there are models respectively for items A to E, for example, in a case where a model for item A is used, a first certainty degree "Conf_11" indicating item A is output. Note that a model that simultaneously outputs the first certainty degrees of respective items A to E may be used. In this case, the model outputs the first certainty degrees "Conf_11" to "Conf_15" corresponding to items A to E in connection with items A to E, respectively.

Note that a model that specifies the number of specific articles may be provided independently from the model that outputs the first certainty degree.

The changing unit 12 conducts one or more inspections that are different from the model inspection either manually or automatically, and changes the first certainty degree based on the obtained inspection result. Specifically, first, the changing unit 12 obtains the inspection result from the obtainment unit 14. Subsequently, with use of the inspection result, the changing unit 12 refers to pre-set determination information, and derives a change value that is used to change the first certainty degree. Subsequently, the changing unit 12 changes the first certainty degree with use of the change value. Subsequently, the changing unit 12 stores the changed first certainty degree, and also outputs the changed first certainty degree to the output information generation unit 18.

The determination information for changing the first certainty degree is information in which determination conditions are associated with change values. FIG. 4 is a diagram for describing a data structure of the determination information.

For example, in a case where FIG. 4 depicts determination information 41 for item A, the changing unit 12 selects a condition equivalent to the inspection result from "condition 1" to "condition 6" . . . under "determination conditions" shown in FIG. 4. Thereafter, the changing unit 12 selects a change value corresponding to the selected condition. For example, in a case where "condition 1" has been selected, the changing unit 12 selects "Chg_11" corresponding to "condition 1". Subsequently, the changing unit 12 changes the first certainty degree with use of the selected change value.

For example, in a case where the name of country A (a country in which the use of a socially improper article is permitted) is described on the external package as a result of conducting an external package inspection with respect to item A, the changing unit 12 detects a condition equivalent to this inspection result. Thereafter, the changing unit 12 obtains a change value corresponding to the condition, and lowers the first certainty degree corresponding to item A based on the change value. In this way, the accuracy of detection of inclusion of a socially improper article is improved.

Also, in a case where the item described on the external package is different from the result of a model inspection as a result of conducting an external package inspection with respect to item B, the changing unit 12 detects a condition equivalent to this inspection result. Thereafter, the changing unit 12 obtains a change value corresponding to the condition, and lowers the first certainty degree corresponding to item B based on the change value. In this way, the accuracy of detection of inclusion of a socially improper article is improved.

Also, in a case where item C is wrapped in specific wrapping paper (wrapping paper of a socially improper article that was detected in the past) as a result of conducting an external package inspection with respect to item C, the changing unit 12 detects a condition equivalent to this inspection result. Thereafter, the changing unit 12 obtains a change value corresponding to the condition, and lowers the first certainty degree corresponding to item C based on the change value. In this way, the accuracy of detection of inclusion of a socially improper article is improved.

Also, in a case where a letter of a predetermined size has a weight of 200 g or more (e.g., in the case of a small postal item that is extremely heavy) as a result of conducting a weight inspection with respect to item D, the changing unit 12 detects a condition equivalent to this inspection result. Thereafter, the changing unit 12 obtains a change value corresponding to the condition, and lowers the certainty degree because there is a possibility of gold smuggling, thereby improving the accuracy of detection of inclusion of a socially improper article.

Also, in a case where a certain number or more of odorous materials have been detected as a result of conducting an odor inspection with respect to item A, the changing unit 12 detects a condition equivalent to this inspection result. Thereafter, the changing unit 12 obtains a change value corresponding to the condition, and lowers the first certainty degree corresponding to item A based on the change value. In this way, the accuracy of detection of inclusion of a socially improper article is improved.

Also, in a case where a particle has been detected after compressing item A as a result of conducting a texture inspection with respect to item A, the changing unit 12 detects a condition equivalent to this inspection result. Thereafter, the changing unit 12 obtains a change value corresponding to the condition, and lowers the first certainty degree corresponding to item A based on the change value. In this way, the accuracy of detection of inclusion of a socially improper article is improved.

Also, in a case where the temperature is 0° C. or lower (e.g., in a case where there is a high possibility that a drug is contained) as a result of conducting a temperature inspection with respect to item E, the changing unit 12 detects a condition equivalent to this inspection result. Thereafter, the changing unit 12 obtains a change value corresponding to the condition, and lowers the first certainty degree corresponding to item E based on the change value. In this way, the accuracy of detection of inclusion of a socially improper article is improved.

Also, in a case where the temperature is 25° C. or higher (e.g., in a case where there is a high possibility that an animal that is prohibited to be imported is contained) as a result of conducting a temperature inspection with respect to item E, the changing unit 12 detects a condition equivalent to this inspection result. Thereafter, the changing unit 12 obtains a change value corresponding to the condition, and lowers the first certainty degree corresponding to item E based on the change value. In this way, the accuracy of detection of inclusion of a socially improper article is improved.

Note that the changing unit 12 may use a second certainty degree as a change value, and change the first certainty degree in accordance with the second certainty degree. A second certainty degree output unit (not shown) calculates the second certainty degree based on an inspection result that is obtained by conducting one or more inspections with respect to an article.

For instance, the second certainty degree is an index indicating, for example, the certainty (likelihood) that the article to be inspected is a specific article in the aforementioned inspection result. Possible examples of the specific article include socially improper articles (such articles as various types of prohibited items and restricted items), and hazardous materials in aviation.

In a case where the first certainty degree is equal to or higher than the pre-set first certainty degree threshold, the first determination unit 13 determines that the article is a specific article. Specifically, first, the first determination unit 13 obtains the first certainty degree. Subsequently, with use of the obtained first certainty degree, the first determination unit 13 refers to threshold information, and determines whether the first certainty degree is equal to or higher than the first certainty degree threshold. Subsequently, in a case where the first certainty degree is equal to or higher than the first certainty degree threshold, the first determination unit 13 determines that the article on which the model inspection was conducted is a specific article. Subsequently, the first determination unit 13 outputs information indicating the detected specific article to the output information generation unit 18.

FIG. 5 is a diagram for describing a data structure of the threshold information. In threshold information 51 shown in FIG. 5, certainty degree thresholds "Th_1" to Th_5" are associated with models A to E that are used respectively in the inspections of items A to E.

For example, in a case where an inspection has been conducted using a model that detects item A and the first certainty degree Conf_11 is equal to or higher than the certainty degree threshold Th_1, it means that the first determination unit 13 has detected item A.

The first threshold changing unit 15 changes the first certainty degree threshold in accordance with the inspection result. Specifically, the first threshold changing unit 15 first obtains the inspection result from the obtainment unit 14. Subsequently, with use of the inspection result, the first threshold changing unit 15 refers to pre-set determination information for changing the first certainty degree threshold, and derives a change value that is used to change the first certainty degree threshold. Subsequently, the first threshold changing unit 15 changes the first certainty degree threshold with use of the change value. Subsequently, the first threshold changing unit 15 outputs the changed first certainty degree threshold to the output information generation unit 18.

The determination information for changing the first certainty degree threshold is information in which determination conditions are associated with threshold change values. FIG. 6 is a diagram for describing a data structure of the determination information. For example, in a case where FIG. 6 depicts determination information 61 for item A, the first threshold changing unit 15 selects a condition equivalent to the inspection result from "condition 1" to "condition 6" . . . under "determination conditions" shown in FIG. 6. Thereafter, the first threshold changing unit 15 selects a change value corresponding to the selected condition. For example, in a case where "condition 1" has been selected, the changing unit 12 selects "Chg_21" corresponding to "condition 1". Subsequently, the first threshold changing unit 15 changes the first certainty degree threshold with use of the selected change value.

In this way, the first certainty degree threshold is changed using the results of one or more inspections that are different from the model inspection; thus, the accuracy of detection of a specific article can be improved.

In a case where there are models respectively for a plurality of specific articles, the first model selection unit 16 selects a model in accordance with the inspection result. Specifically, first, the first model selection unit 16 obtains the inspection result from the obtainment unit 14. Subsequently, with use of the inspection result, the first model selection unit 16 refers to pre-set model selection information, and selects a model to be used in the model inspection.

The model selection information is information in which model determination conditions are associated with models. FIG. 7 is a diagram for describing a data structure of the model selection information.

For example, in the case of model selection information 71 shown in FIG. 7, the first model selection unit 16 selects a condition equivalent to the inspection result from "model condition 1" to "model condition 6" . . . under "model determination conditions" shown in FIG. 7. Thereafter, the first model selection unit 16 selects a model corresponding to the selected condition. For example, in a case where "model condition 1" has been selected, the first model selection unit 16 selects model "A" corresponding to "model condition 1". Subsequently, with use of the selected model "A", the first model selection unit 16 switches among models to be used in the model inspection.

By thus automatically switching among models to be used in the model inspection, the work efficiency of the inspector can be improved.

The risk changing unit 17 changes the risk associated with a specific article in accordance with the inspection result. The risk is an index indicating a degree of hazard of a specific article (the extent of the risk). For example, the risk may be denoted by two levels of "high" and "low", or may be denoted by three or more levels.

Figure 8:
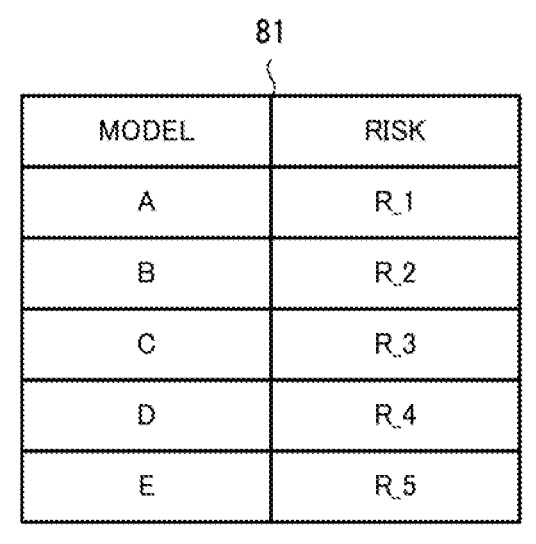

Specifically, first, the risk changing unit 17 refers to pre-set risk information, and determines a risk corresponding to the model that is currently used. FIG. 8 is a diagram for describing a data structure of the risk information. The risk information is information in which models are associated with risks.

For example, in a case where an article is a wine bottle, this article is determined to be at high risk if the wine bottle contains a hazardous material.

Also, the risk changing unit 17 obtains the inspection result from the obtainment unit 14. Subsequently, in accordance with the inspection result, the risk changing unit 17 refers to pre-set determination information for changing the risk, and selects a risk change value that is used to change the risk.

FIG. 9 is a diagram for describing a data structure of the determination information. The determination information for changing the risk is information in which determination conditions are associated with risk change values.

For example, in a case where FIG. 9 depicts determination information 91 for item A, the risk changing unit 17 selects a condition equivalent to the inspection result from "condition 1" to "condition 6" . . . under "determination conditions" shown in FIG. 9. Thereafter, the risk changing unit 17 selects a risk change value corresponding to the selected condition. For example, in a case where "condition 1" has been selected, the risk changing unit 17 selects "RChg_1" corresponding to "condition 1".

Subsequently, the risk changing unit 17 changes the risk with use of the selected risk change value. Subsequently, the risk changing unit 17 outputs the changed risk to the output information generation unit 18.

In the examples of FIG. 8 and FIG. 9, in a case where model "A" has been selected, the risk changing unit 17 selects risk "R_1" corresponding to model "A". Next, the risk changing unit 17 selects a risk change value based on the inspection result. In a case where "RChg_1" has been selected as a risk change value, the risk changing unit 17 changes risk "R_1" with use of risk change value "RChg_1".

For example, in a case where the name of a country on a blacklist is described as a result of an external package inspection, the risk of the article is set to a risk that is higher than the current one.

Also, the risk changing unit 17 may include a risk determination unit. Note that the risk determination unit may be provided independently from the risk changing unit 17.

The risk determination unit outputs risk management indexes of specific articles based on risks and pre-set risk conditions. A risk condition is, for example, information indicating the number of specific articles. A risk management index is, for example, an index (score) determined based on a risk and a risk condition.

For example, in a case where the risk of specific article A is "low" and one specific article A has been detected inside an external package as a result of the inspection, "1" is set as the extent of the risk. Also, in a case where the risk of specific article A is "low" and a plurality of specific articles A have been detected inside an external package as a result of the inspection, the extent of the risk becomes high compared to the case where the number of specific articles A is one, and thus "3" is set thereas, for example.

In a case where the risk of specific article B is "high" and one specific article B has been detected inside an external package as a result of the inspection, the risk of specific article B is high even though the number of specific article B is one, and thus "5" is set as the extent of the risk, for example. Also, in a case where the risk of the specific article is "high" and a plurality of specific articles B have been detected inside an external package as a result of the inspection, the extent of the risk becomes high compared to the risk of the case where the number of specific articles B is one, and thus "7" is set thereas, for example.

The output information generation unit 18 generates output information by converting the transmission image, the first certainty degree, the first certainty degree threshold, the risk, or information indicating one of these into a format that can be output from the output apparatus 25, and transmits the output information to the output apparatus 25. In a case where the output apparatus 25 is a rotating light, for example, the rotating light emits light and/or outputs a sound upon obtaining the output information.

[Apparatus Operations]

Figure 10:
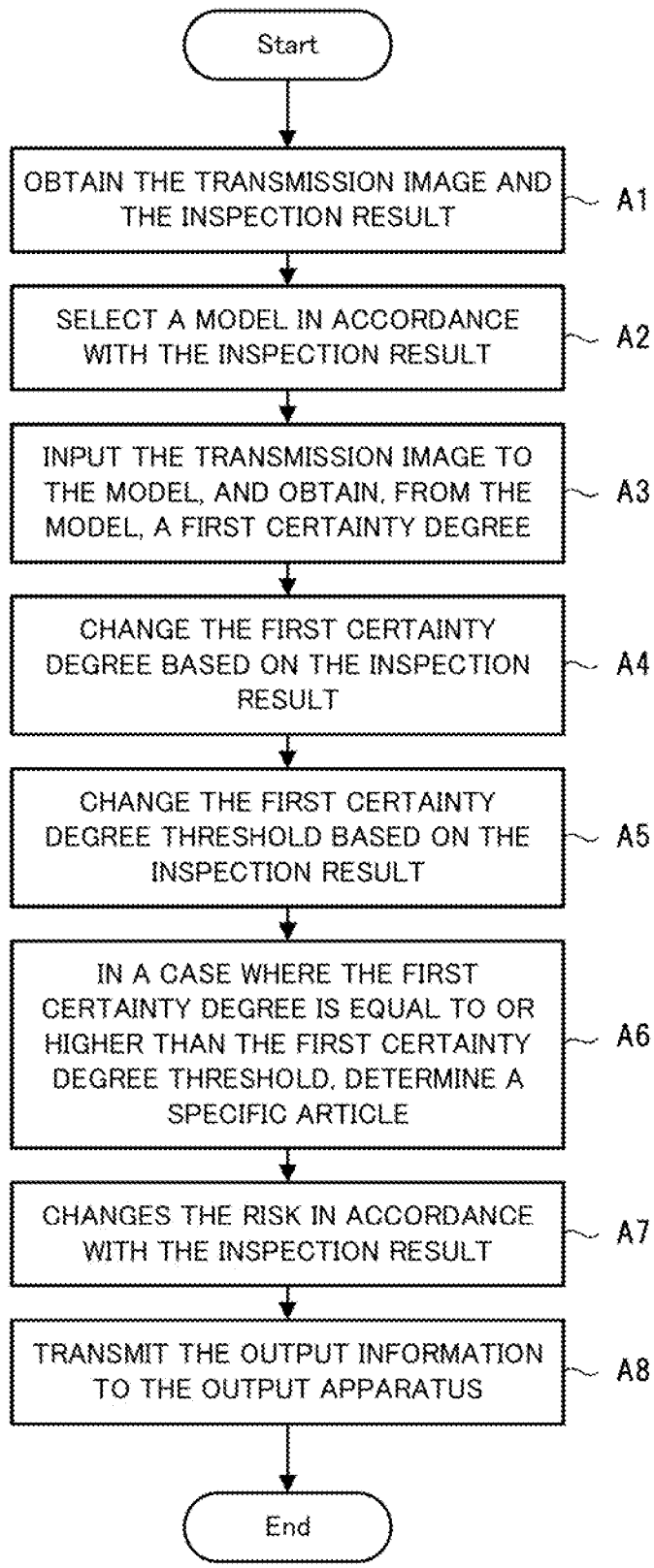
FIG. 10 is a diagram for describing one example of the operations of the inspection assistance apparatus.

Next, the operations of the inspection assistance apparatus in the first example embodiment of the invention will be described using FIG. 10. FIG. 10 is a diagram for describing one example of the operations of the inspection assistance apparatus. In the following description, FIG. 1 to FIG. 9 will be referred to as appropriate. Also, in the first example embodiment, the inspection assistance method is implemented by causing the inspection assistance apparatus to operate. Therefore, the following description of the operations of the inspection assistance apparatus applies to the inspection assistance method in the example embodiment.

As shown in FIG. 10, first, the obtainment unit 14 obtains a transmission image and an inspection result (an image obtained by capturing an article or an external package of the article, an inspection result input by the input apparatus 23, an output result from the sensor 24 (various types of sensors), and the like) (step A1). Subsequently, in step A1, the obtainment unit 14 outputs the inspection result to the first threshold changing unit 15 and the first model selection unit 16. The obtainment unit 14 outputs the transmission image to the first certainty degree output unit 11.

Next, in a case where there are models respectively for a plurality of specific articles, the first model selection unit 16 selects a model in accordance with the inspection result (step A2).

Specifically, in step A2, first, the first model selection unit 16 obtains the inspection result from the obtainment unit 14. Subsequently, in step A2, with use of the inspection result, the first model selection unit 16 refers to pre-set model selection information, and selects a model to be used in the model inspection.

Next, the first certainty degree output unit 11 inputs the transmission image to the model, and obtains, from the model, a first certainty degree indicating that the article or the article inside the external package is a specific article (step A3).

Specifically, in step A3, first, the first certainty degree output unit 11 obtains the transmission image from the obtainment unit 14. Subsequently, in step A3, the first certainty degree output unit 11 inputs the obtained transmission image to the model. Subsequently, in step A3, the first certainty degree output unit 11 obtains the first certainty degree output from the model. Subsequently, in step A3, the first certainty degree output unit 11 outputs the first certainty degree to the changing unit 12 and the output information generation unit 18.

Next, the changing unit 12 conducts one or more inspections that are different from the model inspection either manually or automatically, and changes the first certainty degree based on the obtained inspection result (step A4).

Specifically, in step A4, first, the changing unit 12 obtains the inspection result from the obtainment unit 14. Subsequently, in step A4, with use of the inspection result, the changing unit 12 refers to pre-set determination information, and derives a change value that is used to change the first certainty degree. Subsequently, in step A4, the changing unit 12 changes the first certainty degree with use of the change value. Subsequently, in step A4, the changing unit 12 stores the changed first certainty degree, and also outputs the changed first certainty degree to the output information generation unit 18.

Next, the first threshold changing unit 15 changes the first certainty degree threshold in accordance with the inspection result (step A5).

Specifically, in step A5, first, the first threshold changing unit 15 obtains the inspection result from the obtainment unit 14. Subsequently, in step A5, with use of the inspection result, the first threshold changing unit 15 refers to pre-set determination information for changing the first certainty degree threshold, and derives a change value that is used to change the first certainty degree threshold. Subsequently, in step A5, the first threshold changing unit 15 changes the first certainty degree threshold with use of the change value. Subsequently, in step A5, the first threshold changing unit 15 outputs the changed first certainty degree threshold to the output information generation unit 18.

Note that no restriction is placed on the order of processing of steps A4 and A5, and processing may be performed in the order of steps A5 and A4. Furthermore, processing of one of steps A4 and A5 may be skipped.

Next, in a case where the first certainty degree is equal to or higher than the pre-set first certainty degree threshold, the first determination unit 13 determines that the article is a specific article (step A6).

Specifically, in step A6, first, the first determination unit 13 obtains the first certainty degree. Subsequently, in step A6, with use of the obtained first certainty degree, the first determination unit 13 refers to threshold information, and determines whether the first certainty degree is equal to or higher than the first certainty degree threshold. Subsequently, in step A6, in a case where the first certainty degree is equal to or higher than the first certainty degree threshold, the first determination unit 13 determines that the article on which the model inspection was conducted is a specific article. Subsequently, in step A6, the first determination unit 13 outputs information indicating the detected specific article to the output information generation unit 18.

Next, the risk changing unit 17 changes the risk associated with the specific article in accordance with the inspection result (step A7).

Specifically, in step A7, first, the risk changing unit 17 refers to pre-set risk information, and obtains a risk corresponding to the model that is currently used. Also, in step A7, the risk changing unit 17 obtains the inspection result from the obtainment unit 14.

Subsequently, in step A7, in accordance with the inspection result, the risk changing unit 17 refers to pre-set determination information for changing the risk, and selects a risk change value that is used to change the risk. Subsequently, in step A7, the risk changing unit 17 changes the risk with use of the risk change value.

Next, the output information generation unit 18 generates output information by converting the transmission image, the first certainty degree, the first certainty degree threshold, the risk, or information indicating one of these into a format that can be output from the output apparatus 25, and transmits the output information to the output apparatus 25 (step A8). In a case where the output apparatus 25 is a rotating light, for example, the rotating light emits light and/or outputs a sound upon obtaining the output information.

In this way, target articles are inspected by executing processing of the aforementioned steps A1 to A8 on a per-article basis.

[Effects of First Example Embodiment]

As described above, according to the first example embodiment, the first certainty degree indicating that an article is a specific article is changed using the results of one or more inspections that are different from the model inspection, and thus the accuracy of detection of a specific article can be improved.

[Program]

The program according to an embodiment 1 of the invention may be a program that causes a computer to execute steps A1 to A8 shown in FIG. 10. By installing this program in a computer and executing the program, the inspection assistance apparatus and the inspection assistance method according to the example embodiment can be realized. In this case, the processor of the computer performs processing to function as the obtainment unit 14, the first model selection unit 16, the first certainty degree output unit 11, the changing unit 12, the first threshold changing unit 15, the first determination unit 13, the risk changing unit 17, and the output information generation unit 18.

Also, the program according to the embodiment may be executed by a computer system constructed by a plurality of computers. In this case, for example, each computer may function as any of the obtainment unit 14, the first model selection unit 16, the first certainty degree output unit 11, the changing unit 12, the first threshold changing unit 15, the first determination unit 13, the risk changing unit 17, and the output information generation unit 18.

Second Example Embodiment

Below, a second example embodiment of the invention will be described with reference to the drawings. Note that in the drawings described below, the elements that have the same functions or corresponding functions are given the same reference sign, and a repetitive description thereof may be omitted.

[Apparatus Configuration]

Figure 11:
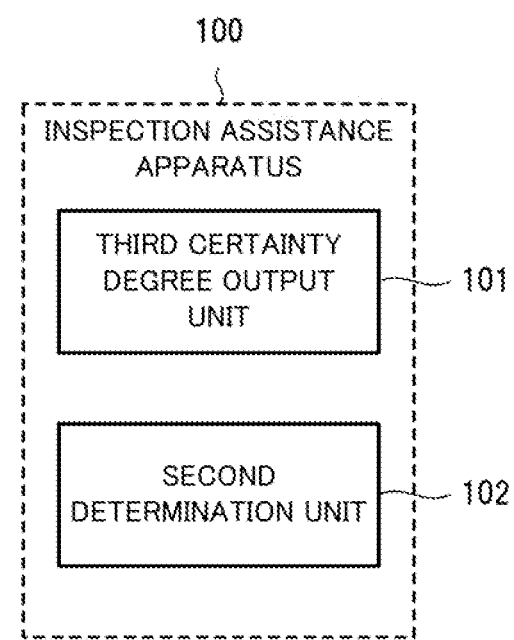
FIG. 11 is a diagram for describing one example of an inspection assistance apparatus.

The configuration of an inspection assistance apparatus 100 in the example embodiment is now described using FIG. 11. FIG. 11 is a diagram for describing one example of the inspection assistance apparatus.

The inspection assistance apparatus 100 shown in FIG. 11 is an apparatus that improves the accuracy of detection of a specific article. Also, as shown in FIG. 11, the inspection assistance apparatus 100 includes a third certainty degree output unit 101 and a second determination unit 102.

Among these, the third certainty degree output unit 101 inputs, to a model, a transmission image obtained by irradiating an article to be inspected with electromagnetic waves as well as an inspection result obtained by conducting one or more inspections with respect to the article, and outputs a third certainty degree indicating that the article is a specific article.

The model is a model that has been generated using AI, such as deep learning. The model is, for example, generated through machine learning by inputting a large amount of transmission images and inspection results as a data set in a learning phase. The model is stored in a storage device provided inside the inspection assistance apparatus 100, or in a storage apparatus provided independently from the inspection assistance apparatus 100.

For instance, the third certainty degree is an index indicating, for example, the certainty (likelihood) that the transmission image includes a specific article.

In a case where the third certainty degree is equal to or higher than a pre-set third certainty degree threshold, the second determination unit 102 determines that the article is a specific article.

In the example embodiment, machine learning is performed with a transmission image and an inspection result input to a model, and thus the accuracy of detection of a specific article can be improved.

[System Configuration]

Figure 12:
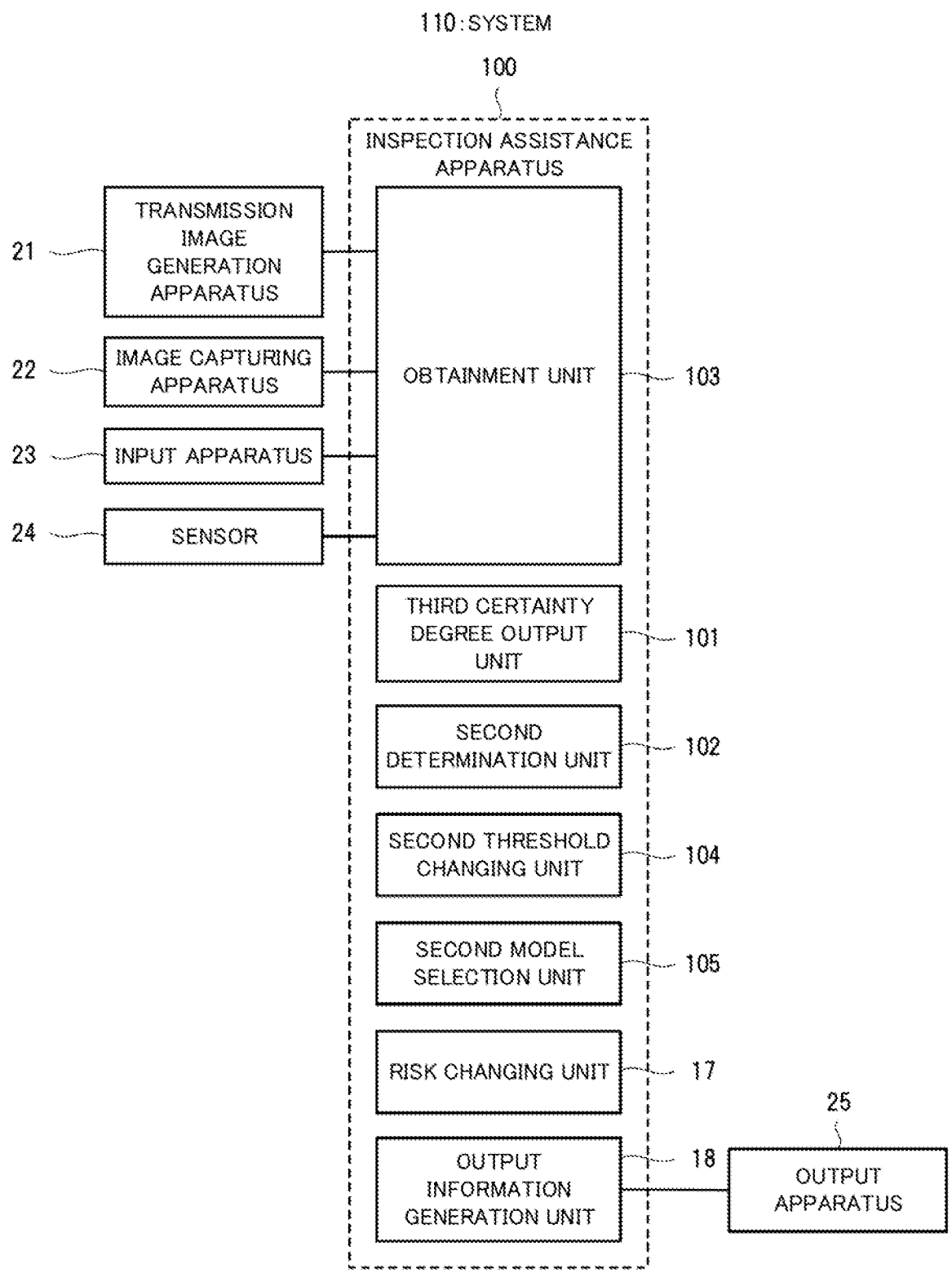
FIG. 12 is a diagram for describing one example of a system that includes an inspection assistance apparatus.

Subsequently, the configuration of the inspection assistance apparatus 100 in the example embodiment will be described more specifically using FIG. 12. FIG. 12 is a diagram for describing one example of a system that includes an inspection assistance apparatus.

As shown in FIG. 12, a system 110 in the example embodiment includes a transmission image generation apparatus 21, an image capturing apparatus 22, an input apparatus 23, a sensor 24, and an output apparatus 25, in addition to the inspection assistance apparatus 100. Also, the inspection assistance apparatus 100 in the example embodiment includes an obtainment unit 103, a second threshold changing unit 104, a second model selection unit 105, a risk changing unit 17, and an output information generation unit 18, in addition to the third certainty degree output unit 101 and the second determination unit 102.

The inspection assistance apparatus 100 is an apparatus that improves the accuracy of the output of a model (the third certainty degree) by using a model that has been generated through machine learning as a result of inputting a transmission image and an inspection result. Therefore, the accuracy of detection of a specific article is also improved. For instance, the inspection assistance apparatus 100 is an information processing apparatus such as a circuit and a computer provided with, for example, a CPU, a programmable device such as an FPGA, a GPU, or one or more of these. Note that the inspection assistance apparatus 100 may be an information processing apparatus such as a server computer and a mobile terminal.

Note that the descriptions of the transmission image generation apparatus 21, the image capturing apparatus 22, the input apparatus 23, the sensor 24, and the output apparatus 25 are omitted as they were provided in the first example embodiment.

Below is a detailed description of the inspection assistance apparatus.

The obtainment unit 103 obtains a transmission image and an inspection result. Subsequently, the obtainment unit 103 outputs the inspection result to the second threshold changing unit 104 and the second model selection unit 105. The transmission image and the inspection result are output to the third certainty degree output unit 101.

The third certainty degree output unit 101 inputs the transmission image and the inspection result to the model, and obtains, from the model, the third certainty degree indicating that an article, or an article inside an external package, is a specific article. Specifically, first, the third certainty degree output unit 101 obtains the transmission image and the inspection result from the obtainment unit 103. Subsequently, the third certainty degree output unit 101 inputs the obtained transmission image and inspection result to the model. Subsequently, the third certainty degree output unit 101 obtains the third certainty degree output from the model. Subsequently, the third certainty degree output unit 101 outputs the third certainty degree to the second determination unit 102 and the output information generation unit 18.

A description is now given of a case where the items of specific articles are A to E, for example. In the second example embodiment, in a case where a model for item A is used, a third certainty degree indicating item A is output. Note that a model that simultaneously outputs the third certainty degrees of respective items A to E may be used.

In a case where the third certainty degree is equal to or higher than the pre-set third certainty degree threshold, the second determination unit 102 determines that the article is a specific article. Specifically, first, the second determination unit 102 obtains the third certainty degree. Subsequently, with use of the obtained third certainty degree, the second determination unit 102 refers to threshold information, and determines whether the third certainty degree is equal to or higher than the third certainty degree threshold. Subsequently, in a case where the third certainty degree is equal to or higher than the third certainty degree threshold, the second determination unit 102 determines that the article on which the model inspection was conducted is a specific article. Subsequently, the second determination unit 102 outputs information indicating the detected specific article to the output information generation unit 18.

For example, in a case where the third certainty degree output from the model for detecting item A is equal to or higher than a second certainty degree threshold, it means that the second determination unit 102 has detected item A.

The second threshold changing unit 104 changes the third certainty degree threshold in accordance with the inspection result. Specifically, first, the second threshold changing unit 104 obtains the inspection result from the obtainment unit 103. Subsequently, with use of the inspection result, the second threshold changing unit 104 refers to pre-set determination information for changing the third certainty degree threshold, and derives a change value that is used to change the third certainty degree threshold. Subsequently, the second threshold changing unit 104 changes the third certainty degree threshold with use of the change value. Subsequently, the second threshold changing unit 104 outputs the changed third certainty degree threshold to the output information generation unit 18.

In a case where there are models respectively for a plurality of specific articles, the second model selection unit 105 selects a model in accordance with the inspection result. Specifically, first, the second model selection unit 105 obtains the inspection result from the obtainment unit 103. Subsequently, with use of the inspection result, the second model selection unit 105 refers to pre-set model selection information, and selects a model to be used in the model inspection.

Note that the description of the risk changing unit 17 is omitted as it was provided in the first example embodiment.

The output information generation unit 18 generates output information by converting the transmission image, the third certainty degree, the third certainty degree threshold, the risk, or information indicating one of these into a format that can be output from the output apparatus 25, and transmits the output information to the output apparatus 25.

[Apparatus Operations]

Figure 13:
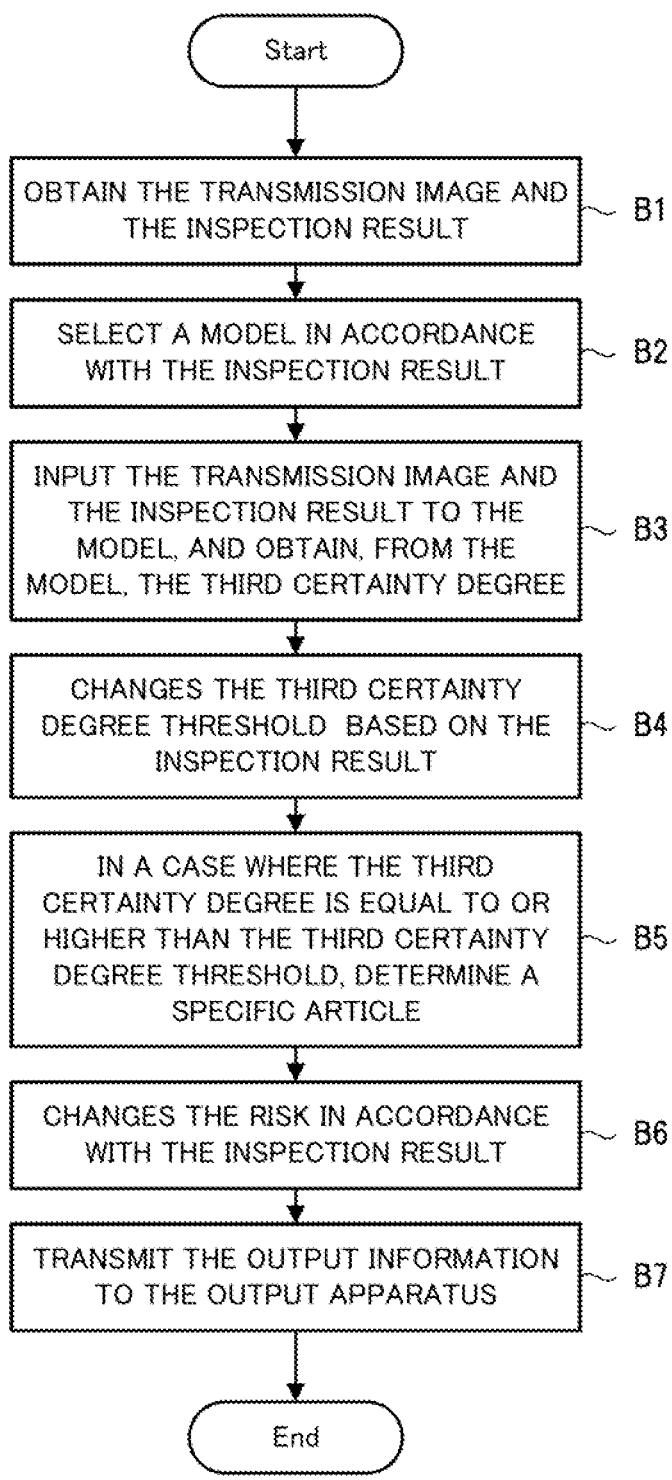
FIG. 13 is a diagram for describing one example of the operations of the inspection assistance apparatus.

Next, the operations of the inspection assistance apparatus in the second example embodiment of the invention will be described using FIG. 13. FIG. 13 is a diagram for describing one example the operations of the inspection assistance apparatus. In the following description, FIG. 11 and FIG. 12 will be referred to as appropriate. Also, in the second example embodiment, the inspection assistance method is implemented by causing the inspection assistance apparatus to operate. Therefore, the following description of the operations of the inspection assistance apparatus applies to the inspection assistance method in the example embodiment.

As shown in FIG. 13, first, the obtainment unit 103 obtains a transmission image and an inspection result (step B1). Subsequently, in step B1, the obtainment unit 103 outputs the inspection result to the second threshold changing unit 104 and the second model selection unit 105. The obtainment unit 103 outputs the transmission image and the inspection result to the third certainty degree output unit 101.

Next, in a case where there are models respectively for a plurality of specific articles, the second model selection unit 105 selects a model in accordance with the inspection result (step B2).

Specifically, in step B2, first, the second model selection unit 105 obtains the inspection result from the obtainment unit 103. Subsequently, in step B2, with use of the inspection result, the second model selection unit 105 refers to pre-set model selection information, and selects a model to be used in the model inspection.

Next, the third certainty degree output unit 101 inputs the transmission image and the inspection result to the model, and obtains, from the model, the third certainty degree indicating that an article, or an article inside an external package, is a specific article (step B3).

Specifically, in step B3, first, the third certainty degree output unit 101 obtains the transmission image and the inspection result from the obtainment unit 103. Subsequently, in step B3, the third certainty degree output unit 101 inputs the obtained transmission image and inspection result to the model. Subsequently, in step B3, the third certainty degree output unit 101 obtains the third certainty degree output from the model. Subsequently, in step B3, the third certainty degree output unit 101 outputs the third certainty degree to the second determination unit 102 and the output information generation unit 18.

Next, the second threshold changing unit 104 changes the third certainty degree threshold in accordance with the inspection result (step B4). Specifically, in step B4, first, the second threshold changing unit 104 obtains the inspection result from the obtainment unit 103. Subsequently, in step B4, with use of the inspection result, the second threshold changing unit 104 refers to pre-set determination information for changing the third certainty degree threshold, and derives a change value that is used to change the third certainty degree threshold. Subsequently, in step B4, the second threshold changing unit 104 changes the third certainty degree threshold with use of the change value. Subsequently, in step B4, the second threshold changing unit 104 outputs the changed third certainty degree threshold to the output information generation unit 18. Note that processing of step B4 may be skipped.

Next, in a case where the third certainty degree is equal to or higher than the pre-set third certainty degree threshold, the second determination unit 102 determines that the article is a specific article (step B5).

Specifically, in step B5, first, the second determination unit 102 obtains the third certainty degree. Subsequently, in step B5, with use of the obtained third certainty degree, the second determination unit 102 refers to threshold information, and determines whether the third certainty degree is equal to or higher than the third certainty degree threshold. Subsequently, in step B5, in a case where the third certainty degree is equal to or higher than the third certainty degree threshold, the second determination unit 102 determines that the article on which the model inspection was conducted is a specific article. Subsequently, in step B5, the second determination unit 102 outputs information indicating the detected specific article to the output information generation unit 18.

Next, the risk changing unit 17 changes the risk associated with the specific article in accordance with the inspection result (step B6).

Specifically, in step B6, first, the risk changing unit 17 refers to pre-set risk information, and obtains a risk corresponding to the model that is currently used. Also, in step B6, the risk changing unit 17 obtains the inspection result from the obtainment unit 103.

Subsequently, in step B6, in accordance with the inspection result, the risk changing unit 17 refers to pre-set determination information for changing the risk, and selects a risk change value that is used to change the risk. Subsequently, in step B6, the risk changing unit 17 changes the risk with use of the risk change value.

Next, the output information generation unit 18 generates output information by converting the transmission image, the third certainty degree, the third certainty degree threshold, the risk, or information indicating one of these into a format that can be output from the output apparatus 25, and transmits the output information to the output apparatus 25 (step B7). In a case where the output apparatus 25 is a rotating light, for example, the rotating light emits light and/or outputs a sound upon obtaining the output information.

[Effects of Second Example Embodiment]

As described above, according to the example embodiment, machine learning is performed with a transmission image and an inspection result input to a model, and thus the accuracy of detection of a specific article can be improved.

[Program]

The program according to an embodiment of the invention may be a program that causes a computer to execute steps B1 to B7 shown in FIG. 13. By installing this program in a computer and executing the program, the inspection assistance apparatus and the inspection assistance method according to the example embodiment can be realized. In this case, the processor of the computer performs processing to function as the obtainment unit 103, the second model selection unit 105, the third certainty degree output unit 101, the second threshold changing unit 104, the second determination unit 102, the risk changing unit 17, and the output information generation unit 18.

Also, the program according to the embodiment may be executed by a computer system constructed by a plurality of computers. In this case, for example, each computer may function as any of the obtainment unit 103, the second model selection unit 105, the third certainty degree output unit 101, the second threshold changing unit 104, the second determination unit 102, the risk changing unit 17, and the output information generation unit 18.

[Physical Configuration]

Figure 14:
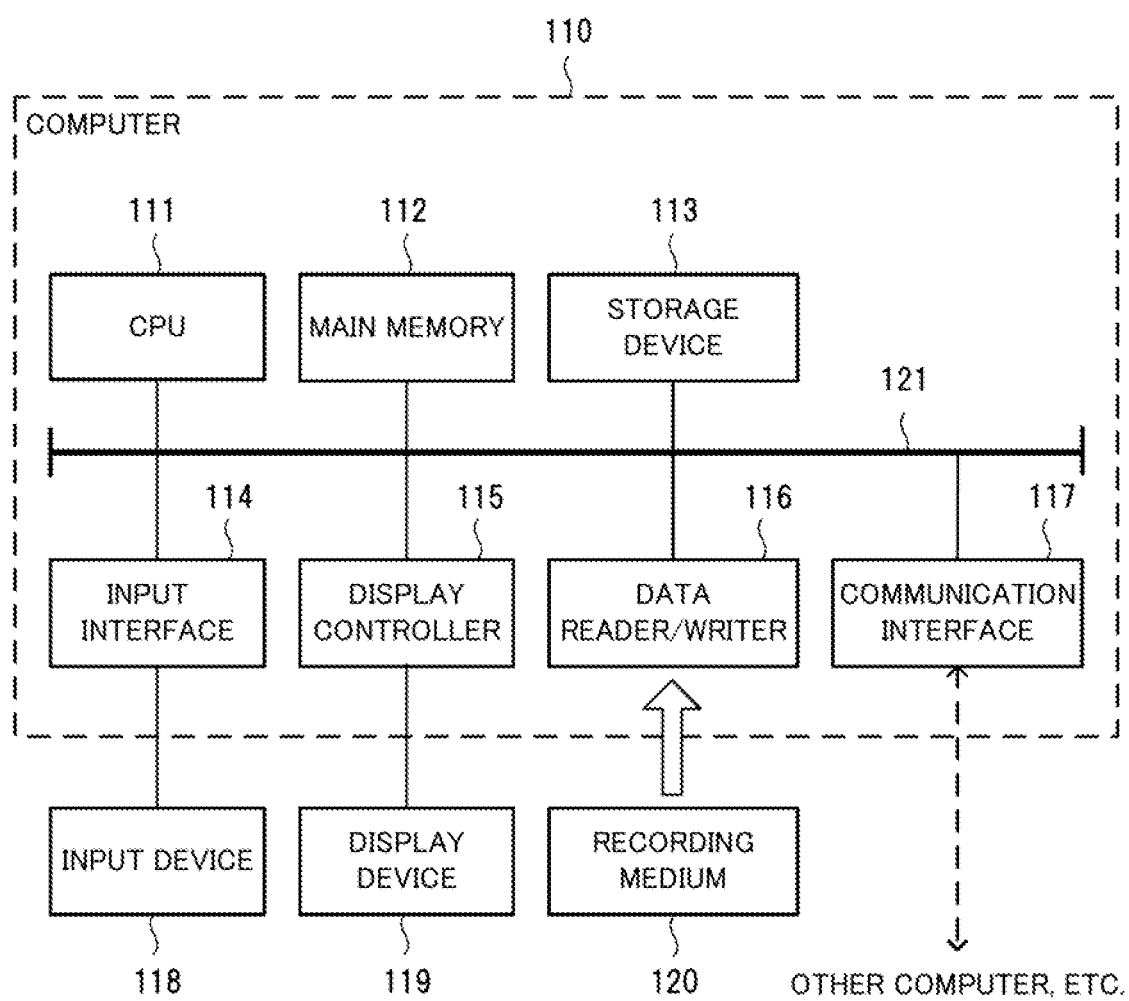
FIG. 14 is a diagram for showing one example of a computer that realizes the inspection assistance apparatus.

Here, a computer that realizes an inspection assistance apparatus by executing the program according to an example embodiment 1 and 2 will be described with reference to FIG. 14. FIG. 14 is a block diagram showing an example of a computer that realizes the inspection assistance apparatus according to an example embodiment 1 and 2 of the invention.

As shown in FIG. 14, a computer 110 includes a CPU 111, a main memory 112, a storage device 113, an input interface 114, a display controller 115, a data reader/writer 116, and a communications interface 117. These units are each connected so as to be capable of performing data communications with each other through a bus 121. Note that the computer 110 may include a GPU or an FPGA in addition to the CPU 111 or in place of the CPU 111.

The CPU 111 opens the program (code) according to this example embodiment, which has been stored in the storage device 113, in the main memory 112 and performs various operations by executing the program in a predetermined order. The main memory 112 is typically a volatile storage device such as a DRAM (Dynamic Random Access Memory). Also, the program according to this example embodiment is provided in a state being stored in a computer-readable recording medium 120. Note that the program according to this example embodiment may be distributed on the Internet, which is connected through the communications interface 117. Note that the recording medium 120 is a non-volatile recording medium.

Also, other than a hard disk drive, a semiconductor storage device such as a flash memory can be given as a specific example of the storage device 113. The input interface 114 mediates data transmission between the CPU 111 and an input device 118, which may be a keyboard or mouse. The display controller 115 is connected to a display device 119, and controls display on the display device 119.

The data reader/writer 116 mediates data transmission between the CPU 111 and the recording medium 120, and executes reading of a program from the recording medium 120 and writing of processing results in the computer 110 to the recording medium 120. The communications interface 117 mediates data transmission between the CPU 111 and other computers.

Also, general-purpose semiconductor storage devices such as CF (Compact Flash (registered trademark)) and SD (Secure Digital), a magnetic recording medium such as a Flexible Disk, or an optical recording medium such as a CD-ROM (Compact Disk Read-Only Memory) can be given as specific examples of the recording medium 120.

[Supplementary Notes]

Furthermore, the following supplementary notes are disclosed regarding the example embodiments described above. Some portion or all of the example embodiments described above can be realized according to (supplementary note 1) to (supplementary note 51) described below, but the below description does not limit the invention.

(Supplementary Note 1)

An inspection assistance apparatus, comprising:

a first certainty degree output unit configured to input, to a model, a transmission image obtained by irradiating an article to be inspected with electromagnetic waves, and output a first certainty degree indicating that the article is a specific article; and a first determination unit configured to determine that the article is the specific article in a case where the first certainty degree that has been changed based on an inspection result is equal to or higher than a pre-set first certainty degree threshold, the inspection result being obtained by conducting one or more inspections with respect to the article.

(Supplementary Note 2)

The inspection assistance apparatus according to supplementary note 1, further comprising:

a second certainty degree output unit configured to determine calculate a second certainty degree based on the inspection result that is obtained by conducting one or more inspections with respect to the article; and a changing unit configured to change the first certainty degree in accordance with the second certainty degree.

(Supplementary Note 3)

The inspection assistance apparatus according to supplementary note 2, further comprising:

a first threshold changing unit configured to change the first certainty degree threshold in accordance with the inspection result.

(Supplementary Note 4)

The inspection assistance apparatus according to any one of supplementary notes 1 to 3, further comprising:

a first model selection unit configured to select a model in accordance with the inspection result in a case where there are models respectively for a plurality of specific articles.

(Supplementary Note 5)

An inspection assistance apparatus, comprising:

a third certainty degree output unit configured to input, to a model, a transmission image obtained by irradiating an article to be inspected with electromagnetic waves as well as an inspection result obtained by conducting one or more inspections with respect to the article, and outputting a third certainty degree indicating that the article is a specific article; and a second determination unit configured to determine that the article is a specific article in a case where the third certainty degree is equal to or higher than a pre-set third certainty degree threshold.

(Supplementary Note 6)

The inspection assistance apparatus according to supplementary note 5, further comprising:

a second threshold changing unit configured to change the third certainty degree threshold in accordance with the inspection result.

(Supplementary Note 7)

The inspection assistance apparatus according to supplementary note 5 or 6, further comprising:

a second model selection unit configured to select a model in accordance with the inspection result in a case where there are models respectively for a plurality of specific articles.

(Supplementary Note 8)

The inspection assistance apparatus according to any one of supplementary notes 5 to 7, further comprising:

a risk determination unit configured to determine an extent of a risk associated with the specific article.

(Supplementary Note 9)

The inspection assistance apparatus according to supplementary note 8, wherein in a case where the extent of the risk falls under a pre-set risk condition, the risk determination unit determines a magnitude of the risk of the article.

(Supplementary Note 10)

An inspection assistance method, comprising:

a first certainty degree output step of inputting, to a model, a transmission image obtained by irradiating an article to be inspected with electromagnetic waves, and outputting a first certainty degree indicating that the article is a specific article; and a first determination step of determining that the article is the specific article in a case where the first certainty degree that has been changed based on an inspection result is equal to or higher than a pre-set first certainty degree threshold, the inspection result being obtained by conducting one or more inspections with respect to the article.

(Supplementary Note 11)

The inspection assistance method according to supplementary note 10, further comprising:

a second certainty degree output step of calculating a second certainty degree based on the inspection result that is obtained by conducting one or more inspections with respect to the article; and a changing step of changing the first certainty degree in accordance with the second certainty degree.

(Supplementary Note 12)

The inspection assistance method according to supplementary note 11, further comprising:

a first threshold changing step of changing the first certainty degree threshold in accordance with the inspection result.

(Supplementary Note 13)

The inspection assistance method according to any one of supplementary notes 10 to 12, further comprising:

a first model selection step of selecting a model in accordance with the inspection result in a case where there are models respectively for a plurality of specific articles.

(Supplementary Note 14)

An inspection assistance method, comprising:

a third certainty degree output step of inputting, to a model, a transmission image obtained by irradiating an article to be inspected with electromagnetic waves as well as an inspection result obtained by conducting one or more inspections with respect to the article, and outputting a third certainty degree indicating that the article is a specific article; and a second determination step of determining that the article is a specific article in a case where the third certainty degree is equal to or higher than a pre-set third certainty degree threshold.

(Supplementary Note 15)

The inspection assistance method according to supplementary note 14, further comprising:

a second threshold changing step of changing the third certainty degree threshold in accordance with the inspection result.

(Supplementary Note 16)

The inspection assistance method according to supplementary note 14 or 15, further comprising:

a second model selection step of selecting a model in accordance with the inspection result in a case where there are models respectively for a plurality of specific articles.

(Supplementary Note 17)

The inspection assistance method according to any one of supplementary notes 14 to 16, further comprising:

a risk determination step of determining an extent of a risk associated with the specific article.

(Supplementary Note 18)

The inspection assistance method according to supplementary note 17, wherein in a case where the extent of the risk falls under a pre-set risk condition, the risk determination step determines a magnitude of the risk of the article.

(Supplementary Note 19)

A computer readable recording medium that includes a program recorded thereon, the program including instructions that cause a computer to carry out:

a first certainty degree output step of inputting, to a model, a transmission image obtained by irradiating an article to be inspected with electromagnetic waves, and outputting a first certainty degree indicating that the article is a specific article; and a first determination step of determining that the article is the specific article in a case where the first certainty degree that has been changed based on an inspection result is equal to or higher than a pre-set first certainty degree threshold, the inspection result being obtained by conducting one or more inspections with respect to the article.

(Supplementary Note 20)

The computer readable recording medium according to Supplementary Note 19, wherein a second certainty degree output step of calculating a second certainty degree based on the inspection result that is obtained by conducting one or more inspections with respect to the article; and a changing step of changing the first certainty degree in accordance with the second certainty degree.

(Supplementary Note 21)

The computer readable recording medium according to Supplementary Note 20, wherein a first threshold changing step of changing the first certainty degree threshold in accordance with the inspection result.

(Supplementary Note 22)

The computer readable recording medium according to any one of supplementary notes 19 to 21, wherein a first model selection step of selecting a model in accordance with the inspection result in a case where there are models respectively for a plurality of specific articles.

(Supplementary Note 23)

A computer readable recording medium that includes a program recorded thereon, the program including instructions that cause a computer to carry out:

a third certainty degree output step of inputting, to a model, a transmission image obtained by irradiating an article to be inspected with electromagnetic waves as well as an inspection result obtained by conducting one or more inspections with respect to the article, and outputting a third certainty degree indicating that the article is a specific article; and a second determination step of determining that the article is a specific article in a case where the third certainty degree is equal to or higher than a pre-set third certainty degree threshold.

(Supplementary Note 24)

The computer readable recording medium according to Supplementary Note 23, wherein a second threshold changing step of changing the third certainty degree threshold in accordance with the inspection result.

(Supplementary Note 25)

The computer readable recording medium according to Supplementary Note 23 or 24, wherein a second model selection step of selecting a model in accordance with the inspection result in a case where there are models respectively for a plurality of specific articles.

(Supplementary Note 26)

The computer readable recording medium according to any one of supplementary notes 23 to 25, wherein a risk determination step of determining an extent of a risk associated with the specific article.

(Supplementary Note 27)

The computer readable recording medium according to Supplementary Note 26, wherein in a case where the extent of the risk falls under a pre-set risk condition, the risk determination step determines a magnitude of the risk of the article.

(Supplementary Note 28)

An inspection assistance apparatus, including:

a first certainty degree output unit configured to input, to a model, a transmission image obtained by irradiating an article to be inspected with electromagnetic waves, and output a first certainty degree indicating that the article is a specific article;

a changing unit configured to change the first certainty degree based on an inspection result that is obtained by conducting one or more inspections with respect to the article; and a first determination unit configured to determine that the article is the specific article in a case where the changed first certainty degree is equal to or higher than a pre-set first certainty degree threshold.

(Supplementary Note 29)

The inspection assistance apparatus according to Supplementary Note 28, further including:

a first threshold changing unit configured to change the first certainty degree threshold in accordance with the inspection result.

(Supplementary Note 30)

The inspection assistance apparatus according to Supplementary Note 28 or 29, further including:

a first model selection unit configured to select a model in accordance with the inspection result in a case where there are a plurality of models.

(Supplementary Note 31)

An inspection assistance apparatus, including:

a second certainty degree output unit configured to input, to a model, a transmission image obtained by irradiating an article to be inspected with electromagnetic waves as well as an inspection result obtained by conducting one or more inspections with respect to the article, and output a second certainty degree indicating that the article is a specific article; and a second determination unit configured to determine that the article is a specific article in a case where the second certainty degree is equal to or higher than a pre-set second certainty degree threshold.

(Supplementary Note 32)

The inspection assistance apparatus according to Supplementary Note 31, further including:

a second threshold changing unit configured to change the second certainty degree threshold in accordance with the inspection result.

(Supplementary Note 33)

The inspection assistance apparatus according to Supplementary Note 31 or 32, further including:

a second model selection unit configured to select a model in accordance with the inspection result in a case where there are a plurality of models.

(Supplementary Note 34)

An inspection assistance method, including:

a first certainty degree output step of inputting, to a model, a transmission image obtained by irradiating an article to be inspected with electromagnetic waves, and outputting a first certainty degree indicating that the article is a specific article;

a changing step of changing the first certainty degree based on an inspection result that is obtained by conducting one or more inspections with respect to the article; and a first determination step of determining that the article is the specific article in a case where the changed first certainty degree is equal to or higher than a pre-set first certainty degree threshold.

(Supplementary Note 35)

The inspection assistance method according to Supplementary Note 34, further including:

a first threshold changing step of changing the first certainty degree threshold in accordance with the inspection result.

(Supplementary Note 36)

The inspection assistance method according to Supplementary Note 34 or 35, further including:

a first model selection step of selecting a model in accordance with the inspection result in a case where there are a plurality of models.

(Supplementary Note 37)

An inspection assistance method, including:

a second certainty degree output step of inputting, to a model, a transmission image obtained by irradiating an article to be inspected with electromagnetic waves as well as an inspection result obtained by conducting one or more inspections with respect to the article, and outputting a second certainty degree indicating that the article is a specific article; and a second determination step of determining that the article is a specific article in a case where the second certainty degree is equal to or higher than a pre-set second certainty degree threshold.

(Supplementary Note 38)

The inspection assistance method according to Supplementary Note 37, further including:

(c) a second threshold changing step of changing the second certainty degree threshold in accordance with the inspection result.

(Supplementary Note 39)

The inspection assistance method according to Supplementary Note 37 or 38, further including:

a second model selection step of selecting a model in accordance with the inspection result in a case where there are a plurality of models.

(Supplementary Note 40)

A computer readable recording medium that includes a program recorded thereon, the program including instructions that cause a computer to carry out:

a first certainty degree output step of inputting, to a model, a transmission image obtained by irradiating an article to be inspected with electromagnetic waves, and outputting a first certainty degree indicating that the article is a specific article;

a changing step of changing the first certainty degree based on an inspection result that is obtained by conducting one or more inspections with respect to the article; and a first determination step of determining that the article is the specific article in a case where the changed first certainty degree is equal to or higher than a pre-set first certainty degree threshold.

(Supplementary Note 41)

The computer readable recording medium according to Supplementary Note 40, wherein the program further includes instructions that cause the computer to carry out:

a first threshold changing step of changing the first certainty degree threshold in accordance with the inspection result.

(Supplementary Note 42)

The computer readable recording medium according to Supplementary Note 40 or 41, wherein the program further includes instructions that cause the computer to carry out:

a first model selection step of selecting a model in accordance with the inspection result in a case where there are a plurality of models.

(Supplementary Note 43)

A computer readable recording medium that includes a program recorded thereon, the program including instructions that cause a computer to carry out:

a second certainty degree output step of inputting, to a model, a transmission image obtained by irradiating an article to be inspected with electromagnetic waves as well as an inspection result obtained by conducting one or more inspections with respect to the article, and outputting a second certainty degree indicating that the article is a specific article; and a second determination step of determining that the article is a specific article in a case where the second certainty degree is equal to or higher than a pre-set second certainty degree threshold.

(Supplementary Note 44)

The computer readable recording medium according to Supplementary Note 43, wherein the program further includes instructions that cause the computer to carry out:

a second threshold changing step of changing the second certainty degree threshold in accordance with the inspection result.

(Supplementary Note 45)

The computer readable recording medium according to Supplementary Note 43 or 44, wherein the program further includes instructions that cause the computer to carry out:

a second model selection step of selecting a model in accordance with the inspection result in a case where there are a plurality of models.

(Supplementary Note 46)

An inspection assistance system, including:

a transmission image generation apparatus that generates a transmission image by irradiating an article to be inspected with electromagnetic waves; and a computer that inspects the article, wherein the computer includes a first certainty degree output unit configured to input the transmission image to a model, and output a first certainty degree indicating that the article is a specific article, a changing unit configured to change the first certainty degree based on an inspection result that is obtained by conducting one or more inspections with respect to the article; and a first determination unit configured to determine that the article is the specific article in a case where the changed first certainty degree is equal to or higher than a pre-set first certainty degree threshold.

(Supplementary Note 47)

The inspection assistance system according to Supplementary Note 46, further including:

a first threshold changing unit configured to change the first certainty degree threshold in accordance with the inspection result.

(Supplementary Note 48)

The inspection assistance system according to Supplementary Note 46 or 47, further including:

a first model selection unit configured to select a model in accordance with the inspection result in a case where there are a plurality of models.

(Supplementary Note 49)

An inspection assistance system, including:

a transmission image generation apparatus that generates a transmission image by irradiating an article to be inspected with electromagnetic waves; and a computer that inspects the article, wherein the computer includes a second certainty degree output unit configured to input, to a model, a transmission image obtained by irradiating an article to be inspected with electromagnetic waves as well as an inspection result obtained by conducting one or more inspections with respect to the article, and output a second certainty degree indicating that the article is a specific article; and a second determination unit configured to determine that the article is a specific article in a case where the second certainty degree is equal to or higher than a pre-set second certainty degree threshold.

(Supplementary Note 50)

The inspection assistance system according to Supplementary Note 49, further including: a second threshold changing unit configured to change the second certainty degree threshold in accordance with the inspection result.

(Supplementary Note 51)

The inspection assistance system according to Supplementary Note 49 or 50, further including:

a second model selection unit configured to select a model in accordance with the inspection result in a case where there are a plurality of models.

Although the invention of this application has been described with reference to exemplary embodiments, the invention of this application is not limited to the above exemplary embodiments. Within the scope of the invention of this application, various changes that can be understood by those skilled in the art can be made to the configuration and details of the invention of this application.

This application is based upon and claims the benefit of priority from Japanese application No. 2020-027543, filed on Feb. 20, 2020, the disclosure of which is incorporated herein in its entirety by reference.

Although the invention of this application has been described with reference to exemplary embodiments, the invention of this application is not limited to the above exemplary embodiments. Within the scope of the invention of this application, various changes that can be understood by those skilled in the art can be made to the configuration and details of the invention of this application.

INDUSTRIAL APPLICABILITY

As described above, according to the invention, it is possible to improve the accuracy of detection of a specific article. The invention is useful in fields where it is necessary to conduct the model inspection using a transmission image.

LIST OF REFERENCE SIGNS 10, 100 Inspection assistance apparatus
11 First certainty degree output unit
12 Changing unit
13 First determination unit
14, 103 Obtainment unit
15 First threshold changing unit
16 First model selection unit
17 Risk changing unit
18 Output information generation unit
20, 110 System
21 Transmission image generation apparatus
22 Image capturing apparatus
23 Input apparatus
24 Sensor
25 Output apparatus
101 Third certainty degree output unit
102 Second determination unit
104 Second threshold changing unit
105 Second model selection unit
110 Computer
111 CPU
112 Main memory
113 Storage device
114 Input interface
115 Display controller
116 Data reader/writer
117 Communication interface
118 Input device
119 Display device
120 Recording medium
121 Bus

What is claimed is:

1. An inspection assistance apparatus, comprising:
at least one memory storing instructions; and
at least one processor configured to execute the instructions to:
input, to a model, a transmission image obtained by irradiating an article to be inspected with electromagnetic waves, and output a first certainty degree indicating that the article is a specific article;
determine that the article is the specific article in a case where the first certainty degree that has been changed based on an inspection result is equal to or higher than a pre-set first certainty degree threshold, the inspection result being obtained by conducting one or more inspections with respect to the article; and
select a model in accordance with the inspection result in a case where there are models respectively for a plurality of specific articles.

2. The inspection assistance apparatus according to claim 1,
wherein the processor is configured to execute the instructions to further:

calculate a second certainty degree based on the inspection result that is obtained by conducting one or more inspections with respect to the article; and change the first certainty degree in accordance with the second certainty degree.

3. The inspection assistance apparatus according to claim 1, wherein the processor is configured to execute the instructions to further:

change the first certainty degree threshold in accordance with the inspection result.

4. An inspection assistance method performed by a computer and comprising:

inputting, to a model, a transmission image obtained by irradiating an article to be inspected with electromagnetic waves, and outputting a first certainty degree indicating that the article is a specific article;

determining that the article is the specific article in a case where the first certainty degree that has been changed based on an inspection result is equal to or higher than a pre-set first certainty degree threshold, the inspection result being obtained by conducting one or more inspections with respect to the article; and selecting a model in accordance with the inspection result in a case where there are models respectively for a plurality of specific articles.

5. A non-transitory computer readable recording medium storing a program executable by a computer to perform processing comprising:

inputting, to a model, a transmission image obtained by irradiating an article to be inspected with electromagnetic waves, and outputting a first certainty degree indicating that the article is a specific article;

determining that the article is the specific article in a case where the first certainty degree that has been changed based on an inspection result is equal to or higher than a pre-set first certainty degree threshold, the inspection result being obtained by conducting one or more inspections with respect to the article; and selecting a model in accordance with the inspection result in a case where there are models respectively for a plurality of specific articles.

* * * * *